United States Patent
Uchikawa (10) Patent No.: US 10,315,316 B2
(45) Date of Patent: Jun. 11, 2019

(54) FLOATING JOINT

(71) Applicant: HONDA MOTOR CO., LTD., Tokyo (JP)

(72) Inventor: Motoki Uchikawa, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/697,577

(22) Filed: Sep. 7, 2017

(65) Prior Publication Data
US 2018/0071925 A1  Mar. 15, 2018

(30) Foreign Application Priority Data
Sep. 13, 2016 (JP) .................................. 2016-178926

(51) Int. Cl.
*B25J 17/02* (2006.01)
*B25B 7/14* (2006.01)
*B25J 9/04* (2006.01)

(52) U.S. Cl.
CPC ....... *B25J 17/0266* (2013.01); *B25J 17/0208* (2013.01); *B25J 17/0275* (2013.01); *B25J 17/0283* (2013.01); *B25B 7/14* (2013.01); *B25J 9/042* (2013.01); *B25J 17/0225* (2013.01)

(58) Field of Classification Search
CPC .... B25J 17/0266; B25J 17/0283; B25J 9/042; B25J 17/0225; B25B 7/14
See application file for complete search history.

(56) References Cited

U.S. PATENT DOCUMENTS

| | | | |
|---|---|---|---|
| 5,410,944 A * | 5/1995 | Cushman | B25J 9/14 74/490.05 |
| 6,593,667 B1 * | 7/2003 | Onodera | G05G 5/06 307/10.1 |
| 6,769,969 B1 * | 8/2004 | Duescher | B24B 1/00 451/287 |
| 6,859,198 B2 * | 2/2005 | Onodera | G05G 9/047 345/156 |
| 7,417,396 B2 * | 8/2008 | Yoshida | G05G 5/005 318/466 |

(Continued)

FOREIGN PATENT DOCUMENTS

| | | |
|---|---|---|
| JP | H07-096487 | 4/1995 |
| JP | H08-066834 | 3/1996 |

(Continued)

OTHER PUBLICATIONS

Japanese Notification of Reasons for Refusal dated Mar. 27, 2018, 2 pages.

*Primary Examiner* — Zakaria Elahmadi
(74) *Attorney, Agent, or Firm* — Rankin, Hill & Clark LLP (57) ABSTRACT

A space-saving floating joint including a locking mechanism that locks a swing of a movable base with respect to a fixed base is provided. A floating joint includes: a fixed base; a movable base; a floating mechanism that floatingly supports the movable base swingably with respect to the fixed base; and a locking mechanism that fixes the movable base in a state of not being swingable with respect to the fixed base. The floating mechanism includes a spherical bearing having a spherical surface, and a spherical washer part that supports the spherical surface slidably. The locking mechanism is provided in an inner part of the spherical bearing.

2 Claims, 10 Drawing Sheets

(56) References Cited

U.S. PATENT DOCUMENTS

| | | | |
|---|---|---|---|
| 8,179,368 B2* | 5/2012 | Yoshida | G05G 5/06 345/156 |
| 8,956,068 B2* | 2/2015 | Mekid | F16M 11/043 248/176.1 |
| 9,327,785 B2* | 5/2016 | Alfayad | B25J 17/0283 |
| 2005/0183532 A1* | 8/2005 | Najafi | A61B 8/00 74/490.01 |
| 2007/0282228 A1* | 12/2007 | Einav | A61B 34/30 601/33 |
| 2011/0253832 A1* | 10/2011 | Wildman | B64C 9/02 244/99.13 |

FOREIGN PATENT DOCUMENTS

| | | |
|---|---|---|
| JP | 11-300545 | 11/1999 |
| JP | 11300545 A * | 11/1999 |

\* cited by examiner

FLOATING JOINT

This application is based on and claims the benefit of priority from Japanese Patent Application No. 2016-178926, filed on 13 Sep. 2016, the content of which is incorporated herein by reference.

BACKGROUND OF THE INVENTION

Field of the Invention

An embodiment of the present invention relates to a floating joint.

Related Art

In the related art, a floating supporting device including a spherical guiding part that swingably guides a movable base with respect to a fixed base via a spherical washer with a point on a Z-axis extending in a vertical direction as a center is known. The floating supporting device includes a locking mechanism to lock a movable base in an initial posture (see, for example, Patent Document 1).

Patent Document 1: Japanese Unexamined Patent Application, Publication No. H11-300545

SUMMARY OF THE INVENTION

In the floating supporting device according to the above application, a locking mechanism is provided in an external part of a spherical guiding part. Thus, in the external part of the spherical guiding part, a space to provide a locking mechanism is necessary not only in the Z-axis direction extending in the vertical direction but also in an X-axis direction and a Y-axis direction extending in a horizontal direction.

In view of the problem of the related art, an embodiment of the present invention is to provide a space-saving floating joint that includes a locking mechanism to lock a swing of a movable base with respect to a fixed base.

In order to achieve the above object, an embodiment of the present invention provides a floating joint including: a fixed base (such as fixed base 10 described later); a movable base (such as movable base 20 described later); a floating mechanism (such as floating mechanism 30 described later) that floatingly supports the movable base swingably with respect to the fixed base; and a locking mechanism (such as locking mechanism 60 described later) that fixes the movable base in a state of not being swingable with respect to the fixed base, wherein the floating mechanism includes a spherical bearing (such as spherical bearing 51 described later) having a spherical surface (such as spherical surface 511 described later), and a spherical washer part (such as spherical washer part 52 described later) that slidably supports the spherical surface, and the locking mechanism is provided in an inner part of the spherical bearing.

According to an embodiment of the present invention, it is possible to make a whole floating mechanism compact since a locking mechanism is provided in an inner part of a spherical bearing of the floating mechanism.

Then, the locking mechanism includes an inner cylinder (such as inner cylinder 33 described later) that is coupled and fixed to the movable base, an intermediate cylinder (such as intermediate cylinder 32 described later) that covers an outer periphery of the inner cylinder, an outer cylinder (such as outer cylinder 31 described later) that covers an outer periphery of the intermediate cylinder and that is coupled to the fixed base, and an elastic member (such as intermediate cylinder biasing spring 34 described later) that couples the intermediate cylinder and the movable base. The intermediate cylinder is provided in a manner of being relatively movable in an axial direction of the intermediate cylinder with respect to the inner cylinder and the outer cylinder. An outer peripheral surface of the inner cylinder and an inner peripheral surface of the intermediate cylinder have step parts (such as intermediate cylinder step part 324 and inner cylinder step part 334 described later) that are engaged with each other.

Thus, in a case where the step parts are in a positional relationship of being abutted to each other with a movement of the intermediate cylinder in the axial direction of the intermediate cylinder with respect to the inner cylinder, the inner cylinder is in a state of not being swingable with respect to the outer cylinder and the intermediate cylinder. Also, in a case where the step parts are in a state of being engaged with each other, the inner cylinder is in a state of being swingable with respect to the outer cylinder and the intermediate cylinder.

Also, at least one step part is provided in an axial direction of each of the inner cylinder and the intermediate cylinder in a positional relationship of a center of the spherical bearing being therebetween.

Thus, the center of the spherical bearing can be the center of swing. Also, since the step parts are arranged in the axial direction of the inner cylinder and the intermediate cylinder in the positional relationship of the center of swing being therebetween, a load can be received evenly in the step parts.

According to an embodiment of the present invention, it is possible to provide a space-saving floating joint including a locking mechanism that locks a swing of a movable base with respect to a fixed base.

DETAILED DESCRIPTION OF THE INVENTION

Figure 1:
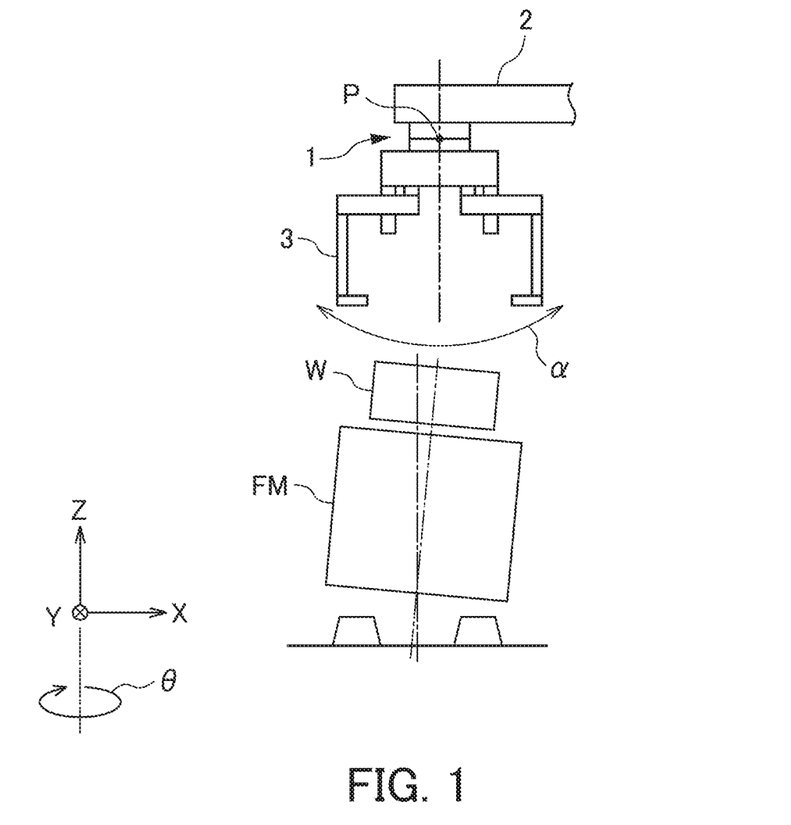
FIG. 1 is a schematic view illustrating a workpiece conveyance robot including a floating joint according to an embodiment of the present invention.
Figure 2:
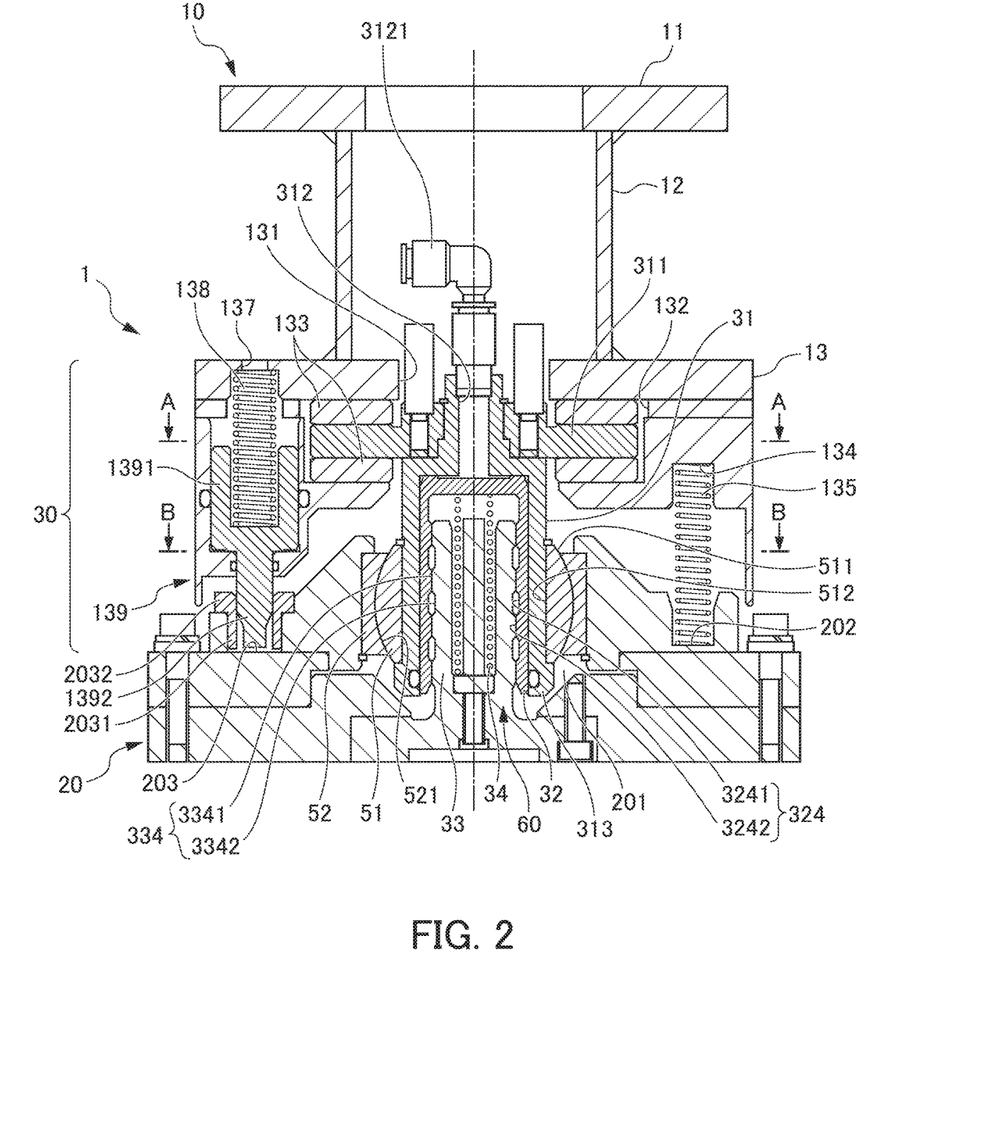
FIG. 2 is a sectional view illustrating a state in which a movable base is fixed to a fixed base by a locking mechanism in the floating joint according to the embodiment of the present invention.
Figure 3:
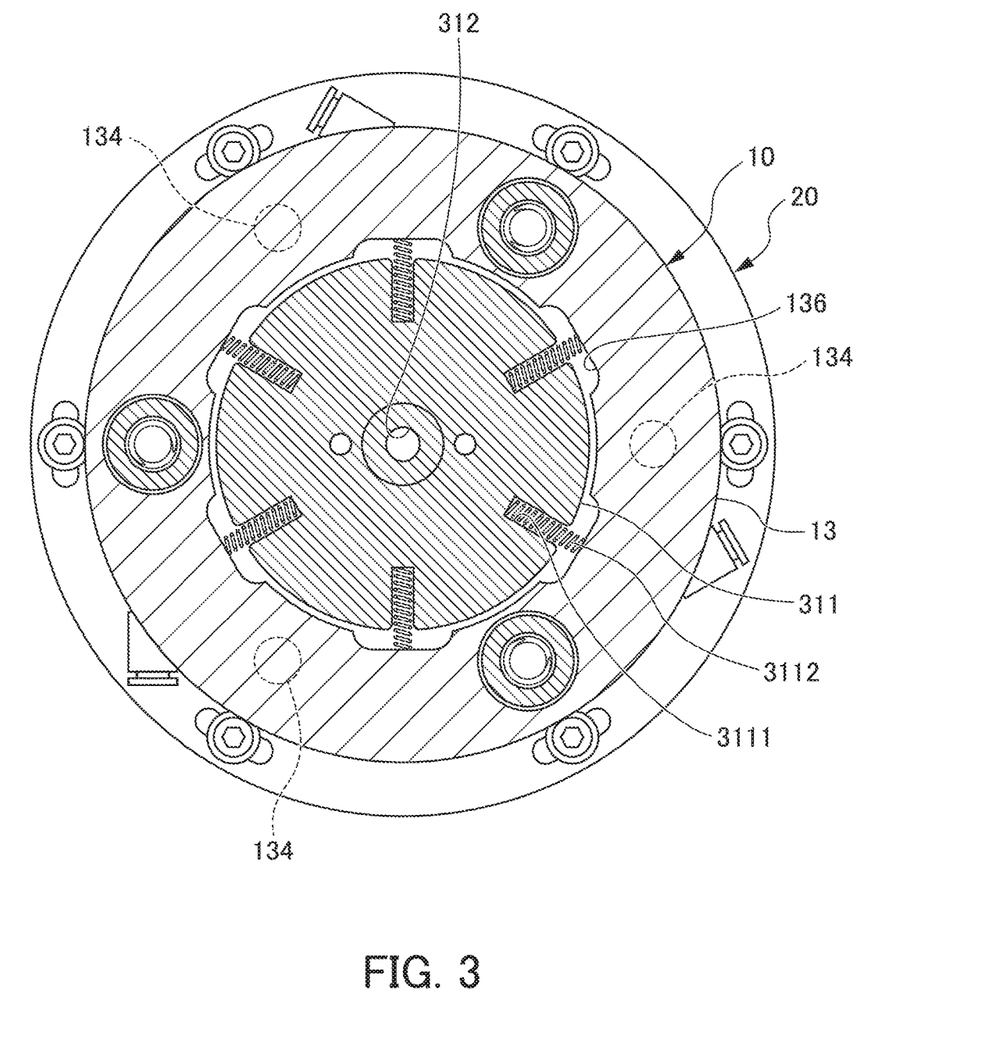
FIG. 3 is a sectional view along the line A-A in FIG. 2.
Figure 4:
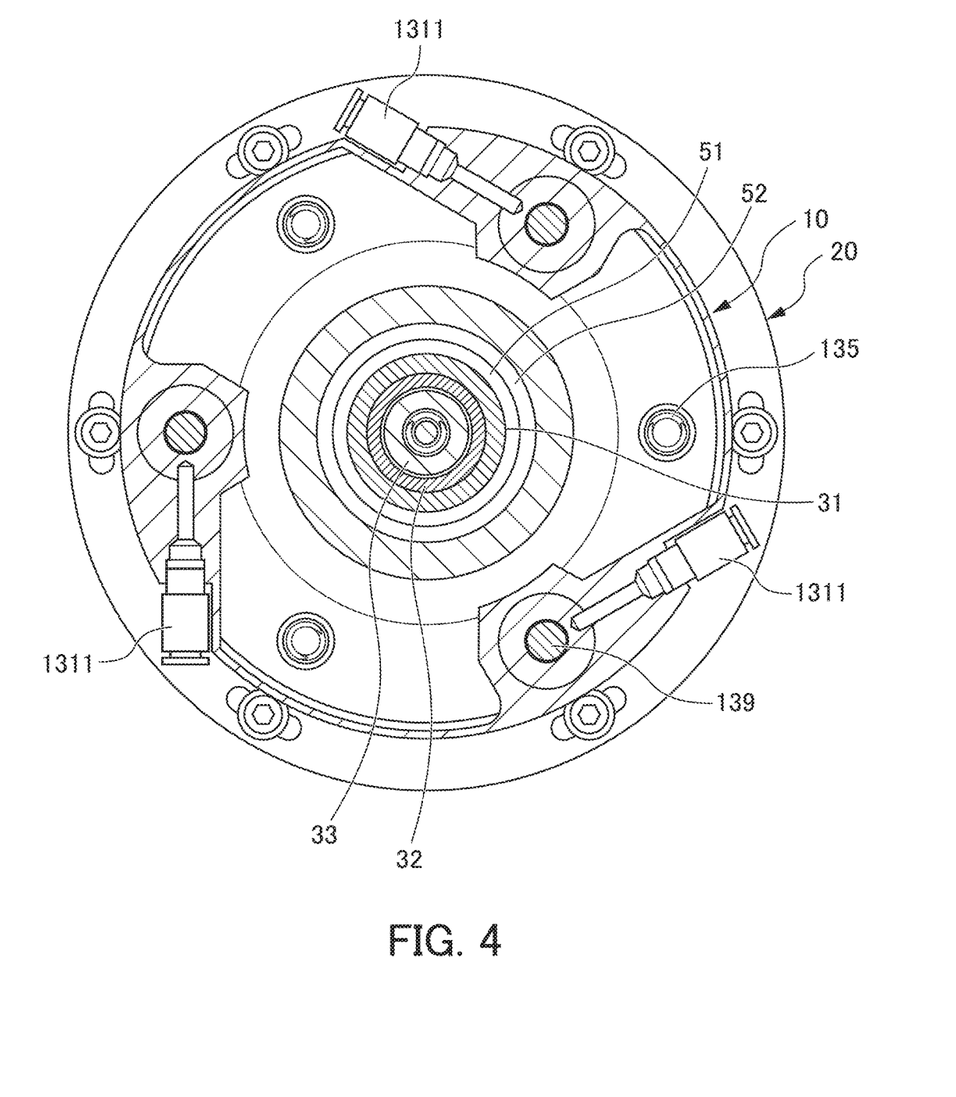
FIG. 4 is a sectional view along the line B-B in FIG. 2.

In the following, an embodiment of the present invention will be described with reference to the drawings. FIG. 1 is a schematic view illustrating a workpiece conveyance robot including a floating joint according to the embodiment of the present invention. FIG. 2 is a sectional view illustrating a state in which a movable base is fixed to a fixed base by a locking mechanism in the floating joint according to the embodiment of the present invention. FIG. 3 is a sectional view along the line A-A in FIG. 2. FIG. 4 is a sectional view along the line B-B in FIG. 2.

As illustrated in FIG. 1, a floating joint 1 of the present embodiment is provided between an arm part 2 and a hand part 3 of a workpiece conveyance robot. The floating joint 1 supports the hand part 3 movably in a horizontal direction, rotatably in the horizontal direction, and swingably with respect to the arm part 2. That is, the floating joint 1 supports the hand part 3 movably in an X-axis direction, a Y-axis direction, and a Z-axis direction, rotatably in a θ direction around a Z-axis, and swingably in an α direction around the center P in FIG. 1 with respect to the arm part 2. Accordingly, a workpiece W held in the hand part 3 is inserted from a plurality of forming machines FM into a press fitting machine PM (see FIG. 12) accurately with positional deviation being controlled. The workpiece W is, for example, a case or the like that is pressed and fitted into an outer side of a stator of a motor including divided cores. In the following, a description will be made with a side of the arm part 2 being defined as an upper side and a side of the hand part 3 being defined as a lower side.

As illustrated in FIG. 2, the floating joint 1 includes a fixed base 10 fixed to the arm part 2 (see FIG. 1), a movable base 20 to a lower surface of which the hand part 3 is fixed, a floating mechanism 30 that floatingly supports the movable base 20 movably in the X-axis direction, the Y-axis direction, and the Z-axis direction, rotatably in the θ direction, and swingably in the α direction with respect to the fixed base 10, and a locking mechanism 60 that brings the movable base 20 back to an initial posture without a positional deviation with respect to the fixed base 10 as illustrated in FIG. 2 and that mechanically locks the movable base 20 in the initial posture.

The fixed base 10 includes an arm part fixing plate 11, a connecting part 12, and a fixing part 13. The arm part fixing plate 11 is fixed to the arm part 2 (see FIG. 1 and the like). The connecting part 12 is integrally connected to the arm part fixing plate 11 and the fixing part 13 and couples the arm part fixing plate 11 and the fixing part 13. The fixing part 13 supports the floating mechanism 30. The floating mechanism 30 includes a spherical bearing 51 and a spherical washer part 52. Also, the locking mechanism 60 includes an outer cylinder 31, an intermediate cylinder 32, an inner cylinder 33, and an intermediate cylinder biasing spring 34 as an elastic member.

More specifically, a through hole 131 penetrating in the vertical direction is formed at the center part of the fixing part 13. The diameter of the through hole 131 at the center part in the vertical direction is enlarged and the part with an enlarged diameter forms an enlarged-diameter part in a through hole 132. In the enlarged-diameter part in the through hole 132, a sliding plate 133 is arranged in each of an upper part and a lower part of the enlarged-diameter part in the through hole 132. Thus, the sliding plates 133 are arranged to be opposed in the vertical direction. As illustrated in FIG. 3, in the part of the fixing part 13 that forms the enlarged-diameter part in the through hole 132, a radial recess part in a fixing part 136 that is recessed in an outer side in a radial direction of the enlarged-diameter part in the through hole 132 and that has a predetermined length in the circumferential direction of the enlarged-diameter part in the through hole 132 is formed. As illustrated in FIG. 3, six radial recess parts in the fixing part 136 are formed at equal intervals in the circumferential direction of the enlarged-diameter part in a through hole 132.

As illustrated in FIG. 2, three through holes 137 are formed at equal intervals in a peripheral part of the fixing part 13, in a circumferential direction of the peripheral part of the fixing part 13. An air feeding opening part 1311 (see FIG. 4) connected to an air feeding device (not illustrated) is connected to each of the three through holes 137. As illustrated in FIG. 2, in each of the three through holes 137, the diameter at the center part in the vertical direction of the through hole 137 is enlarged and this part with an enlarged diameter forms a lower protruded pin base housing part. A spring 138, and a base 1391 of a lower protruded pin 139 are housed in the lower protruded pin base housing part. The base 1391 of the lower protruded pin 139 has a cylinder shape. The upper end part of the base 1391 is opened, and the lower end part of the base 1391 is filled and integrally connected to the upper end part of a pin part 1392 protruding to the lower side. An upper part of the pin part 1392 is formed to have a large diameter and a lower part thereof is formed to have a small diameter. The diameter of the intermediate part between the upper part and the lower part becomes gradually smaller toward the lower side. The spring 138 includes a tension spring. The lower end part of the spring 138 is abutted to the lower end part of the base 1391 of the lower protruded pin 139 and the upper end part of the spring 138 is abutted to a peripheral part of the through hole 137 in the fixing part 13.

Also, as illustrated in FIG. 2 and FIG. 3, a spring upper part engagement recess part 134 is formed at each position between the three through holes 137 in the peripheral part of the fixing part 13 in the circumferential direction of the peripheral part of the fixing part 13. Each of the spring upper part engagement recess parts 134 is formed in a manner recessed from the lower surface of the peripheral part of the fixing part 13 toward the upper side, the upper end part of a swing direction holding spring 135 including a compression spring being inserted thereto and being abutted to the fixing part 13.

The outer cylinder 31 has a cylinder shape with the lower end part being opened and the upper end part being filled. A flange 311 is provided in the upper end part of the outer cylinder 31. The flange 311 has a disk shape, and is arranged between the sliding plates 133 arranged to be opposite in the vertical direction, and slides with respect to the sliding plates 133. With this sliding, the flange 311 and the outer cylinder 31 are moved in the horizontal direction (X-axis direction and Y-axis direction), and the outer cylinder 31 is coupled to the fixed base 10. Also, as illustrated in FIG. 3, a radial recess part 3111 that is recessed in an inner side in a radial direction of the flange 311 is formed in the flange 311. Six radial recess parts 3111 are formed at equal intervals in a circumferential direction of the flange 311. A flange spring 3112 including a compression spring is arranged in each of the radial recess parts 3111. One end part of the flange spring 3112 is abutted to the bottom part of the radial recess part 3111 and the other end part of the flange spring 3112 is abutted to a part, which forms the radial recess part in a fixing part 136, of the fixing part 13. With this abutment, the flange 311 and the outer cylinder 31 are biased to move back to an initial position, that is, a position in which the shaft centers of the flange 311 and the outer cylinder 31 match the shaft center position of the enlarged-diameter part in the through hole 132 (see FIG. 2) as illustrated in FIG. 3, when being moved in the horizontal direction (X-axis direction and Y-axis direction) with respect to the fixed base 10.

A through hole for air feeding 312 is formed in the upper end part of the outer cylinder 31. The through hole for air feeding 312 is formed in such a manner as to penetrate the upper end part of the outer cylinder 31 in the vertical direction. An air feeding opening part 3121 connected to an air feeding device (not illustrated) is connected to the through hole for air feeding 312. A lower end part flange 313 protruding to the outer side in a radial direction of the outer cylinder 31 is provided in the lower end part of the outer cylinder 31.

The intermediate cylinder 32 has a cylinder shape with the lower end part being opened and the upper end part being filled. The intermediate cylinder 32 that has a positional relationship of being coaxial with the outer cylinder 31, is arranged in a space that is surrounded by the inner peripheral surface of the outer cylinder 31. The outer cylinder 31 covers the outer periphery of the intermediate cylinder 32. The upper end part of the intermediate cylinder 32 faces the through hole for air feeding 312 of the outer cylinder 31. When the air is fed to the through hole for air feeding 312 of the outer cylinder 31, the intermediate cylinder 32 is moved in a lower direction in the axial direction of the intermediate cylinder 32 with respect to the outer cylinder 31. When the air is ejected from the through hole for air feeding 312 of the outer cylinder 31 in this state, the intermediate cylinder 32 is moved in an upper direction in the axial direction of the intermediate cylinder 32 with respect to the outer cylinder 31 by the biasing force of the intermediate cylinder biasing spring 34 described later.

An intermediate cylinder step part 324 is provided on the inner peripheral surface of the intermediate cylinder 32. The intermediate cylinder step part 324 includes an annular protruded part in an intermediate cylinder 3241 that protrudes from the inner peripheral surface of the intermediate cylinder 32 toward the inner side of the intermediate cylinder 32 and extends around the inner peripheral surface of the intermediate cylinder 32, and a recess part 3242 that is relatively recessed between annular protruded parts in an intermediate cylinder 3241 that are adjacent to each other in the axial direction of the intermediate cylinder 32. A plurality of annular protruded parts in the intermediate cylinder 3241 is provided at equal intervals in the axial direction of the intermediate cylinder 32 and in a positional relationship of the center P of the spherical bearing 51 (see FIG. 5 and the like) being therebetween.

The upper end part of the inner cylinder 33 is opened and the lower end part thereof is filled and integrally connected to the movable base 20, whereby the inner cylinder 33 is coupled and fixed to the movable base 20. The inner cylinder 33 has a cylinder shape. The inner cylinder 33 that has a positional relationship of being coaxial with the intermediate cylinder 32, is arranged in a space and that is surrounded by the inner peripheral surface of the intermediate cylinder 32. The intermediate cylinder 32 covers the outer periphery of the inner cylinder 33. Thus, the intermediate cylinder 32 is provided in a manner of being relatively movable in the axial direction of the intermediate cylinder 32 with respect to the inner cylinder 33 and the outer cylinder 31. The intermediate cylinder biasing spring 34 that includes a compression spring and that functions as an elastic member to couple the intermediate cylinder 32 and the movable base 20 is arranged in the space surrounded by the inner peripheral surface of the inner cylinder 33. The lower end part of the intermediate cylinder biasing spring 34 is abutted to the lower end part of the inner cylinder 33 and the upper end part of the intermediate cylinder biasing spring 34 is abutted to the upper end part of the intermediate cylinder 32. With the intermediate cylinder biasing spring 34, the intermediate cylinder 32 is biased in the upper direction in the axial direction of the intermediate cylinder 32.

An inner cylinder step part 334 is provided on the outer peripheral surface of the inner cylinder 33. The inner cylinder step part 334 includes an annular protruded part in an inner cylinder 3341 that protrudes from the outer peripheral surface of the inner cylinder 33 to the outer side of the inner cylinder 33 and that extends around the outer peripheral surface of the inner cylinder 33, and a recess part 3342 that is relatively recessed between annular protruded parts in the inner cylinder 3341 that are adjacent to each other in the axial direction of the inner cylinder 33. A plurality of annular protruded parts in the inner cylinder 3341 is provided at equal intervals in the axial direction of the inner cylinder 33 and in a positional relationship of the center P of the spherical bearing 51 (see FIG. 5 and the like) being therebetween.

Figure 7:
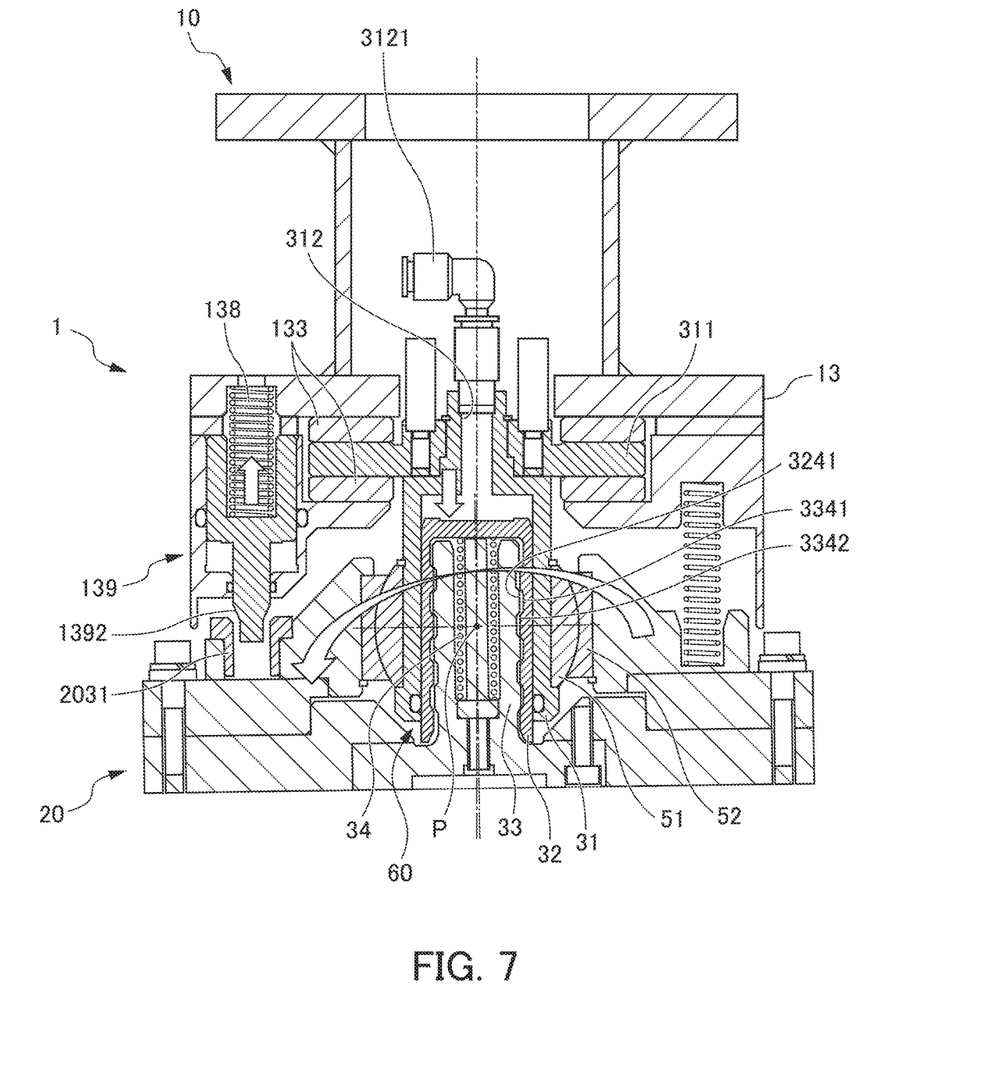
FIG. 7 is a sectional view illustrating a state in which the movable base is brought into a state of being horizontally movable and being swingable with respect to the fixed base by the locking mechanism and in which the movable base swings in the counterclockwise direction with respect to the fixed base in the floating joint according to the embodiment of the present invention.
Figure 8:
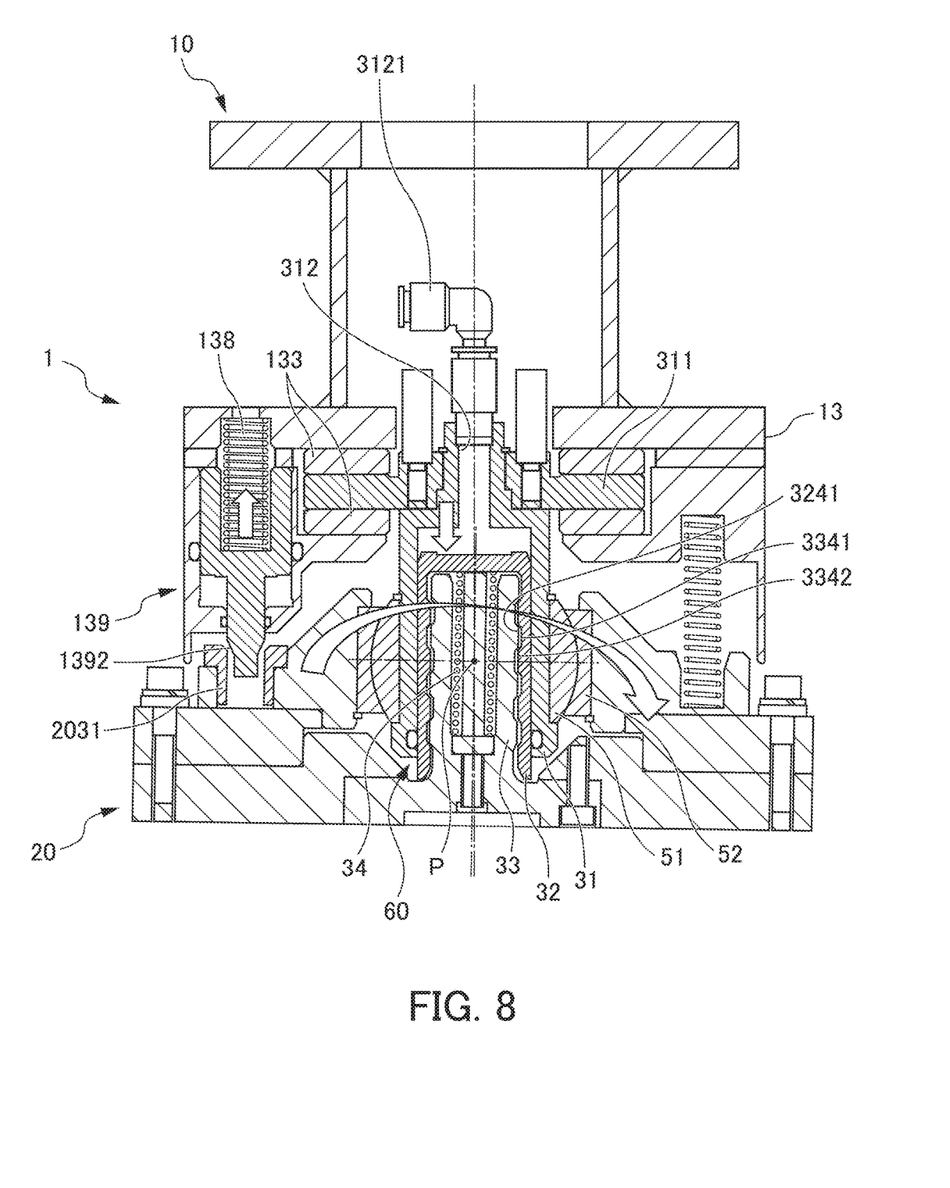
FIG. 8 is a sectional view illustrating a state in which the movable base is brought into a state of being horizontally movable and being swingable with respect to the fixed base by the locking mechanism and in which the movable base swings in the clockwise direction with respect to the fixed base in the floating joint according to the embodiment of the present invention.

As illustrated in FIG. 2, when the intermediate cylinder 32 is moved in the axial direction of the intermediate cylinder 32 with respect to the inner cylinder 33 and when the annular protruded parts in an intermediate cylinder 3241 and the annular protruded parts in an inner cylinder 3341 are in a positional relationship of being abutted to each other, the inner cylinder 33 is in a state of not being swingable with respect to the outer cylinder 31 and the intermediate cylinder 32. That is, the locking mechanism 60 including the inner cylinder 33 and the intermediate cylinder 32 fixes (locks) the movable base 20 in a state of not being swingable with respect to the fixed base 10. As illustrated in FIG. 7 and FIG. 8, when the intermediate cylinder 32 is moved in the axial direction of the intermediate cylinder 32 with respect to the inner cylinder 33 and when the annular protruded parts in the intermediate cylinder 3241 and the annular protruded parts in the inner cylinder 3341 are in a positional relationship of being engaged with each other, that is, the annular protruded parts in the intermediate cylinder 3241 are in a state of being fitted into and engaged with the recess part 3342 between the annular protruded parts in the inner cylinder 3341 that are adjacent to each other in the axial direction of the inner cylinder 33, the inner cylinder 33 is in a state of being swingable with respect to the outer cylinder 31 and the intermediate cylinder 32.

A cylindrical hole part 201 is formed in the movable base 20. The cylindrical hole part 201 is formed in a positional relationship of being coaxial with the inner cylinder 33 in such a manner as to surround the peripheral surface of the inner cylinder 33. The spherical bearing 51, the spherical washer part 52, the outer cylinder 31, and the intermediate cylinder 32 are arranged in the cylindrical hole part 201.

The spherical bearing 51 has a spherical shape. A spherical surface 511 is included as the outer surface of the spherical bearing 51. A columnar bearing through hole 512 penetrating in the vertical direction and in the diameter direction of the spherical bearing 51 is formed in the spherical bearing 51. The diameter of the bearing through hole 512 is slightly smaller than the outer diameter of the outer cylinder 31. The outer cylinder 31 into which the inner cylinder 33 and the intermediate cylinder 32 are inserted is inserted into the bearing through hole 512 slidably with respect to the spherical bearing 51. Thus, the locking mechanism 60 including the inner cylinder 33, the intermediate cylinder 32, the outer cylinder 31, and the intermediate cylinder biasing spring 34 is provided in the inner part of the spherical bearing 51. The upper surface of the lower end part flange 313 of the outer cylinder 31 is abutted to the part of the spherical bearing 51 that forms the lower end of the bearing through hole 512. With this abutment, the outer cylinder 31 is not detached from the spherical bearing 51.

The spherical washer part 52 includes an annular member with its outer diameter being slightly smaller than the inner diameter of the cylindrical hole part 201. The spherical washer part 52 is fixed, in a positional relationship of being coaxial with the cylindrical hole part 201, in the part of the movable base 20 which forms the side surface of the cylindrical hole part 201. A bearing supporting groove 521 including a part of the spherical surface is formed in the inner peripheral surface of the spherical washer part 52. The bearing supporting groove 521 has a shape of forming a part of the spherical surface along the outer surface of the spherical bearing 51. The spherical bearing 51 is fitted into the bearing supporting groove 521. Accordingly, the spherical bearing 51 is supported by the spherical washer part 52 slidably and rotatably with respect to the spherical washer part 52 with the center P of the spherical bearing 51 as the center.

A spring lower part engagement recess part 202 is formed in the movable base 20. The spring lower part engagement recess part 202 is formed in a manner of being recessed in a lower direction from the upper surface of the movable base 20. The lower end part of the swing direction holding spring 135 is inserted into the spring lower part engagement recess part 202 and is abutted to the movable base 20. With this abutment, the movable base 20 is biased with respect to the fixed base 10 and the upper surface of the lower end part flange 313 of the outer cylinder 31 is brought back to the state of being abutted to the lower end part of the spherical bearing 51 as illustrated in FIG. 2 in the case where the outer cylinder 31 slides with respect to the spherical bearing 51 and the movable base 20 becomes close to the fixed base 10.

Also, a lower protruded pin-inserted recess part 203 is formed in the upper surface of the movable base 20. The lower protruded pin-inserted recess part 203 is formed in a manner of being recessed in the lower direction from the upper surface of the movable base 20. A washer part for the leading end of a pin 2031 is provided in the lower protruded pin-inserted recess part 203. The washer part for the leading end of the pin 2031 has a cylinder shape, with one end part and the other end part thereof being opened and a washer flange 2032 being provided in the one end part. The outer diameter of the washer part for the leading end of the pin 2031 is slightly smaller than the inner diameter of the lower protruded pin-inserted recess part 203. The washer part for the leading end of the pin 2031 is inserted into the lower protruded pin-inserted recess part 203 in the positional relationship of being coaxial with the lower protruded pin-inserted recess part 203 and in the positional relationship in which the washer flange 2032 is placed at the upper end. The inner diameter of the washer part for the leading end of the pin 2031 is slightly larger than the outer diameter of the part with a large diameter on the upper part of the pin part 1392 of the lower protruded pin 139. The pin part 1392 of the lower protruded pin 139 is inserted into the washer part for the leading end of the pin 2031.

Figure 5:
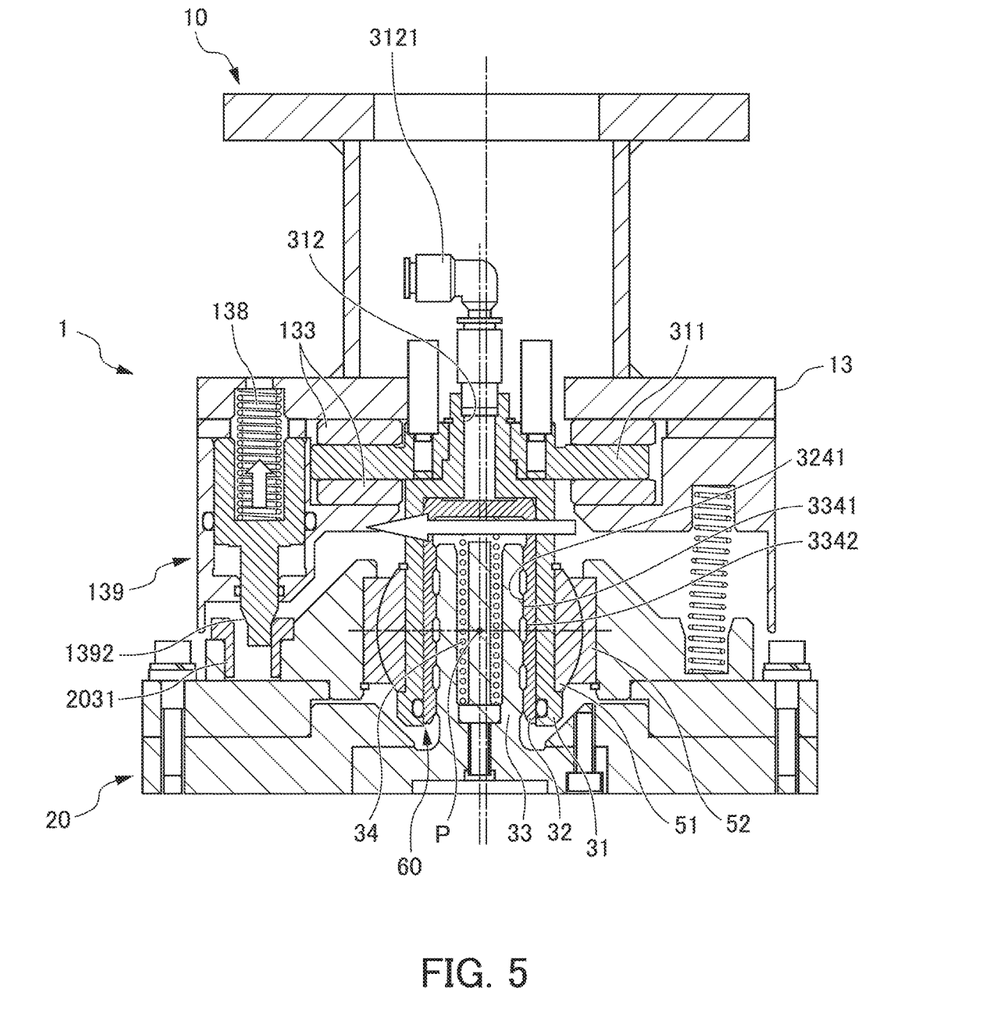
FIG. 5 is a sectional view illustrating a state in which the movable base is brought into a state of being horizontally movable and not being swingable with respect to the fixed base by the locking mechanism and in which the movable base is moved horizontally in the left direction with respect to the fixed base in the floating joint according to the embodiment of the present invention.
Figure 6:
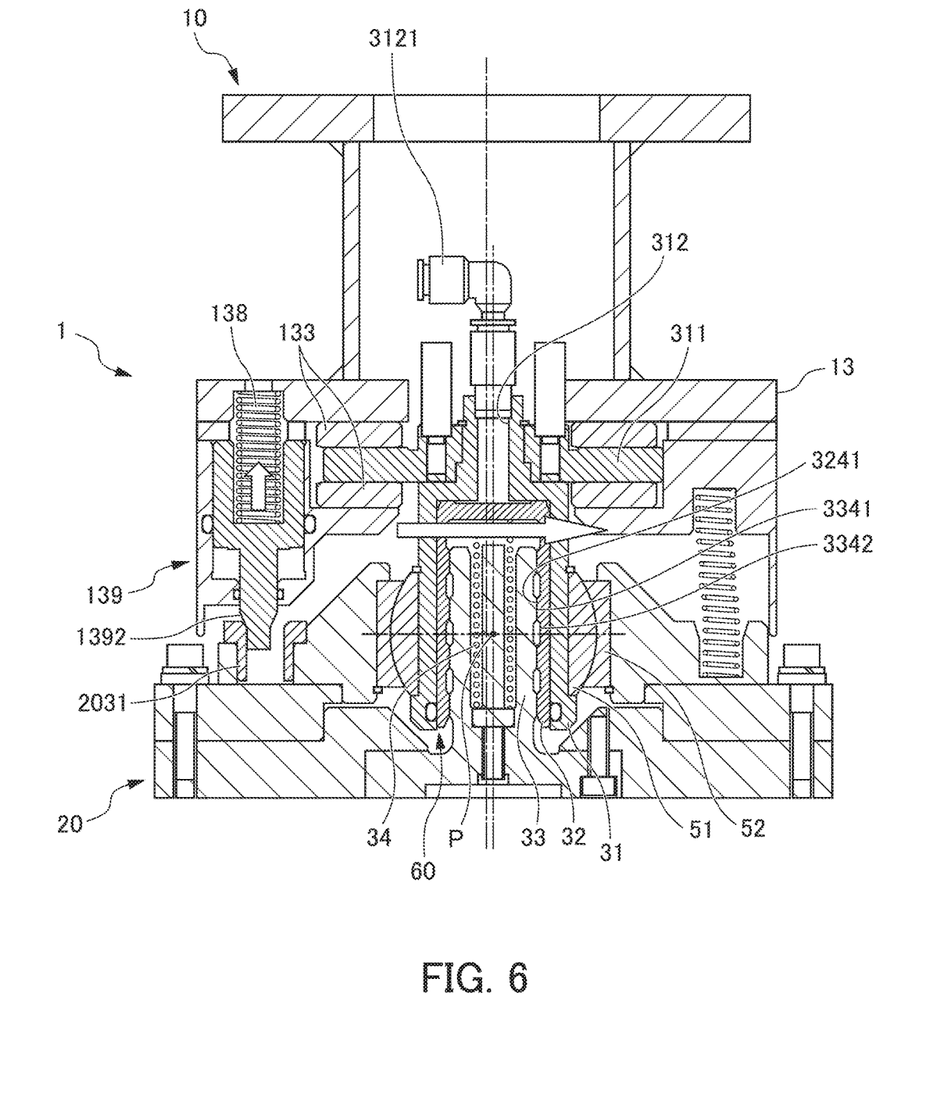
FIG. 6 is a sectional view illustrating a state in which the movable base is brought into a state of being horizontally movable and not being swingable with respect to the fixed base by the locking mechanism and in which the movable base is moved horizontally in the right direction with respect to the fixed base in the floating joint according to the embodiment of the present invention.

Next, an operation of switching the movable base 20 between states of being horizontally movable and not being horizontally movable with respect to the fixed base 10 will be described. FIG. 5 is a sectional view illustrating a state in which the movable base 20 is brought into a state of being horizontally movable and not being swingable with respect to the fixed base 10 by the locking mechanism 60 and in which the movable base 20 is horizontally moved in the left direction with respect to the fixed base 10 in the floating joint 1 according to the embodiment of the present invention. FIG. 6 is a sectional view illustrating a state in which the movable base 20 is brought into the state of being horizontally movable and not being swingable with respect to the fixed base 10 by the locking mechanism 60 and in which the movable base 20 is horizontally moved in the right direction with respect to the fixed base 10 in the floating joint 1 according to the embodiment of the present invention.

First, the air is fed from each of the three air feeding opening parts 1311 (see FIG. 4). Then, as illustrated in FIG. 2, the lower protruded pin 139 is moved to the lower side against the biasing force of the spring 138 and the part with a large diameter on the upper part of the pin part 1392 of the lower protruded pin 139 is inserted into the washer part for the leading end of the pin 2031. Here, the part with a large diameter on the upper part of the pin part 1392 of the lower protruded pin 139 can be hardly moved in the horizontal direction (X-axis direction and Y-axis direction) in the washer part for the leading end of the pin 2031. Thus, the movable base 20 also cannot be moved in the horizontal direction and is fixed with respect to the fixed base 10. Also, the annular protruded parts in the intermediate cylinder 3241 and the annular protruded parts in the inner cylinder 3341 are in a positional relationship of being abutted to each other and the inner cylinder 33 is in a state of not being swingable with respect to the outer cylinder 31 and the intermediate cylinder 32. That is, the hand part 3 and the movable base 20 are not movable in the X-axis direction and the Y-axis direction, not rotatable in the θ direction around the Z-axis, and not swingable in the α direction around the center P in FIG. 1 with respect to the arm part 2 (see FIG. 1) and the fixed base 10. Note that movement in the Z-axis direction in FIG. 1 is possible.

Next, feeding of the air from each of the three air feeding opening parts 1311 is stopped and the air is ejected. Then, as illustrated in FIG. 5 and FIG. 6, with the biasing force of the spring 138, the lower protruded pin 139 is moved to the upper side and the part with a small diameter on the lower part of the pin part 1392 of the lower protruded pin 139 is inserted into the washer part for a leading end of a pin 2031. In this state, the flange 311 of the outer cylinder 31 is slidable with respect to the sliding plates 133. Thus, the movable base 20 can be moved with respect to the fixed base 10 and the part with a small diameter on the lower part of the pin part 1392 can be moved in the washer part for the leading end of the pin 2031 as illustrated in FIG. 5 and FIG. 6.

That is, the hand part 3 and the movable base 20 are movable in the X-axis direction in FIG. 1 with respect to the arm part 2 (see FIG. 1) and the fixed base 10 (see FIG. 2). Similarly, the hand part 3 and the movable base 20 are movable in the Y-axis direction and the Z-axis direction and rotatable in the θ direction around the Z-axis in FIG. 1 with respect to the arm part 2 and the fixed base 10. However, swing in the α direction around the center P is not possible.

Next, the operation of switching the movable base 20 between states of being swingable and not being swingable in the α direction around the center P (see FIG. 1) with respect to the fixed base 10 will be described. FIG. 7 is a sectional view illustrating a state in which the movable base 20 is brought into a state of being horizontally movable and being swingable with respect to the fixed base 10 by the locking mechanism 60 and in which the movable base 20 swings in the counterclockwise direction with respect to the fixed base 10 in the floating joint 1 according to the embodiment of the present invention. FIG. 8 is a sectional view illustrating a state in which the movable base 20 is brought into a state of being horizontally movable and being swingable with respect to the fixed base 10 by the locking mechanism 60 and in which the movable base 20 swings in the clockwise direction with respect to the fixed base 10 in the floating joint 1 according to the embodiment of the present invention.

First, feeding of the air from each of the three air feeding opening parts 1311 (see FIG. 4) is stopped and the air is ejected. Then, as illustrated in FIG. 5 and FIG. 6, with the biasing force of the spring 138, the lower protruded pin 139 is moved to the upper side and the part with a small diameter on the lower part of the pin part 1392 of the lower protruded pin 139 is inserted into the washer part for the leading end of the pin 2031. As described above, in this state, the hand part 3 and the movable base 20 are movable in the X-axis direction, the Y-axis direction, and the Z-axis direction and rotatable in the θ direction around the Z-axis, but are not swingable in the α direction around the center P in FIG. 1 with respect to the arm part 2 and the fixed base 10.

Next, the air is fed from the air feeding opening part 3121 to the through hole for air feeding 312 at the upper end part of the outer cylinder 31. Then, as illustrated in FIG. 7 and FIG. 8, the intermediate cylinder 32 is moved to the lower side against the biasing force of the intermediate cylinder biasing spring 34. Accordingly, the annular protruded parts in the intermediate cylinder 3241 and the annular protruded parts in the inner cylinder 3341 are brought into a positional relationship of being engaged with each other, that is, the annular protruded parts in the intermediate cylinder 3241 are fitted into and engaged with the recess part 3342 between the annular protruding parts in the inner cylinder 3341 that are adjacent to each other in the axial direction of the inner cylinder 33. Accordingly, the intermediate cylinder 32 and the inner cylinder 33 are not tightly abutted to each other and there is room therebetween. Thus, as illustrated in FIG. 7 and FIG. 8, the inner cylinder 33 and the movable base 20 are in a state of being swingable with respect to the outer cylinder 31, the intermediate cylinder 32, and the fixed base 10 with the center P of the spherical bearing 51 as the center of the swing.

Figure 9:
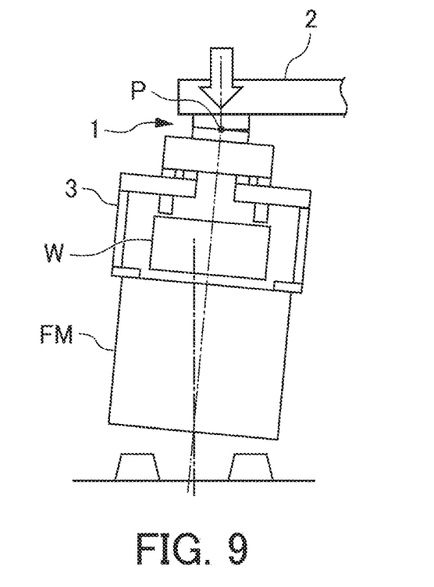
FIG. 9 is a schematic view illustrating a state in which a hand part of the workpiece conveyance robot including the floating joint according to the embodiment of the present invention is arranged at the position of a workpiece.
Figure 10:
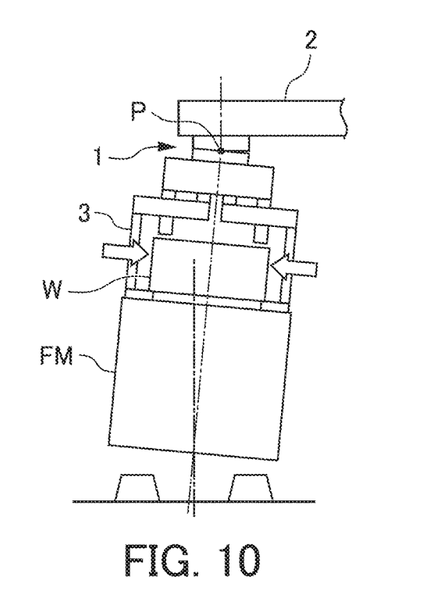
FIG. 10 is a schematic view illustrating a state in which the workpiece is gripped by the hand part of the workpiece conveyance robot including the floating joint according to the embodiment of the present invention.
Figure 11:
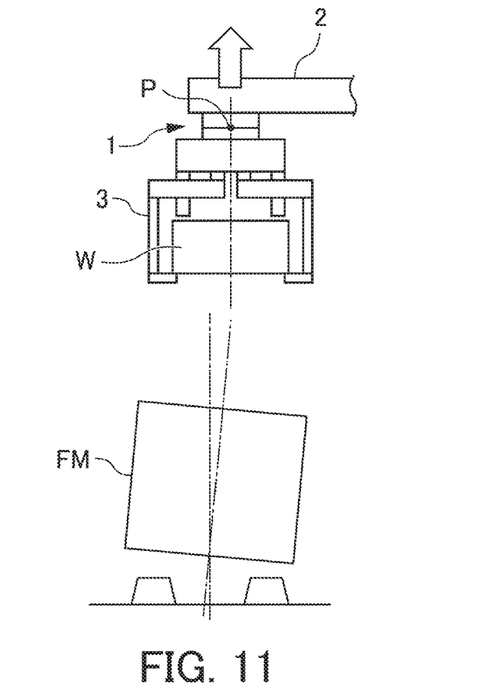
FIG. 11 is a schematic view illustrating a state in which the workpiece is held up by the hand part of the workpiece conveyance robot including the floating joint according to the embodiment of the present invention.
Figure 12:
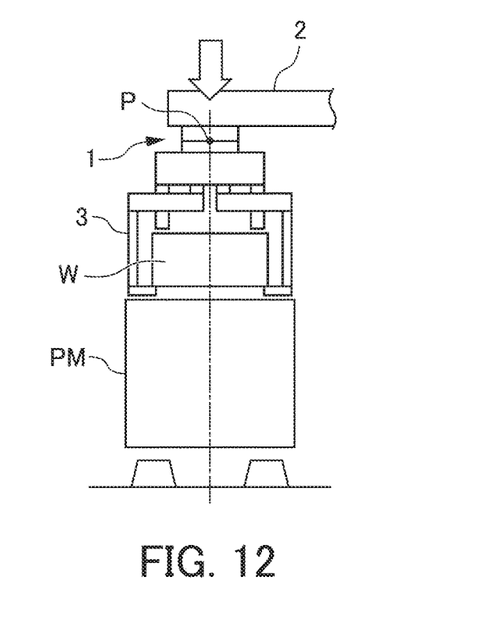
FIG. 12 is a schematic view illustrating a state in which the workpiece is inserted into a press fitting machine by the hand part of the workpiece conveyance robot including the floating joint according to the embodiment of the present invention.

Next, the operation of conveying a workpiece W with the hand part 3 and the arm part 2 from a forming machine FM to a press fitting machine PM will be described. FIG. 9 is a schematic view illustrating a state in which the hand part 3 of the workpiece conveyance robot including the floating joint 1 according to the embodiment of the present invention is arranged at a position of the workpiece W. FIG. 10 is a schematic view illustrating a state in which the workpiece W is gripped by the hand part 3 of the workpiece conveyance robot including the floating joint 1 according to the embodiment of the present invention. FIG. 11 is a schematic view illustrating a state in which the workpiece W is held up by the hand part 3 of the workpiece conveyance robot including the floating joint 1 according to the embodiment of the present invention. FIG. 12 is a schematic view illustrating a state in which the workpiece W is inserted into the press fitting machine PM by the hand part 3 of the workpiece conveyance robot including the floating joint 1 according to the embodiment of the present invention.

First, as illustrated in FIG. 1, the arm part 2 is moved in such a manner that the hand part 3 is placed above the workpiece W supported by the forming machine FM. Then, lock by the locking mechanism 60 is released and the movable base 20 is made to be movable in the X-axis direction, the Y-axis direction, and the Z-axis direction, rotatable in the θ direction around the Z-axis, and swingable in the α direction around the center P in FIG. 1 with respect to the fixed base 10 as illustrated in FIG. 7 and FIG. 8. Accordingly, the hand part 3 is movable in the X-axis direction, the Y-axis direction, and the Z-axis direction, rotatable in the θ direction around the Z-axis, and swingable in the α direction around the center P in FIG. 1 with respect to the arm part 2.

Next, the arm part 2 is lowered and the hand part 3 is moved in a lower direction as illustrated in FIG. 9, and the workpiece W inclined along with the forming machine FM is gripped by the hand part 3 as illustrated in FIG. 10. Then, as illustrated in FIG. 11, the arm part 2 is raised and the hand part 3 is moved in an upper direction. Then, lock by the locking mechanism 60 is performed, whereby the hand part 3 and the movable base 20 are brought into an initial state of not being movable in the X-axis direction and the Y-axis direction, not being rotatable in the θ direction around the Z-axis, and not being swingable in the α direction around the center P in FIG. 1 with respect to the arm part 2 and the fixed base 10 as illustrated in FIG. 2. Accordingly, the workpiece W is supported at a regular position at which insertion into the press fitting machine PM is possible. Then, as illustrated in FIG. 12, the arm part 2 is moved in such a manner that the hand part 3 is placed above the press fitting machine PM. Then, the arm part 2 is lowered and the workpiece W is inserted into the press fitting machine PM.

According to the present embodiment, the following effect can be acquired. In the present embodiment, the floating joint 1 includes a fixed base 10, a movable base 20, a floating mechanism 30 that floatingly supports the movable base 20 swingably with respect to the fixed base 10, and a locking mechanism 60 that fixes the movable base 20 in a state of not being swingable with respect to the fixed base 10. The floating mechanism 30 includes a spherical bearing 51 having a spherical surface 511, and a spherical washer part 52 that slidably supports the spherical surface 511. The locking mechanism 60 is provided in an inner part of the spherical bearing 51.

Since the locking mechanism 60 is provided in the inner part of the spherical bearing 51 of the floating mechanism 30, it is possible to make the whole floating mechanism 30 compact.

Also, in the present embodiment, the locking mechanism 60 includes an inner cylinder 33 coupled and fixed to the movable base 20, an intermediate cylinder 32 that covers the outer periphery of the inner cylinder 33, an outer cylinder 31 that covers the outer periphery of the intermediate cylinder 32 and that is coupled to the fixed base 10, and an intermediate cylinder biasing spring 34 that functions as an elastic member to couple the intermediate cylinder 32 and the movable base 20. The intermediate cylinder 32 is provided in a manner of being relatively movable in the axial direction of the intermediate cylinder 32 with respect to the inner cylinder 33 and the outer cylinder 31. An outer peripheral surface of the inner cylinder 33 and the inner peripheral surface of the intermediate cylinder 32 have step parts engaged with each other (intermediate cylinder step part 324 and inner cylinder step part 334).

Accordingly, when an annular protruded part in an intermediate cylinder 3241 and an annular protruded part in an inner cylinder 3341 are in a positional relationship of being abutted to each other with the movement of the intermediate cylinder 32 in the axial direction of the intermediate cylinder 32 with respect to the inner cylinder 33, the inner cylinder 33 can be brought into a locked state of not being swingable with respect to the outer cylinder 31 and the intermediate cylinder 32. Also, when the annular protruded part in an intermediate cylinder 3241 is fitted into and engaged with a recess part 3342 between annular protruded parts in an inner cylinder 3341 that are adjacent to each other in the axial direction of the inner cylinder 33, the inner cylinder 33 can be brought into an unlocked state of being swingable with respect to the outer cylinder 31 and the intermediate cylinder 32.

Also, in the present embodiment, a plurality of annular protruded parts in an inner cylinder 3341 and a plurality of annular protruded parts in an intermediate cylinder 3241 as step parts are respectively provided in the axial direction of the inner cylinder 33 and the intermediate cylinder 32 in a positional relationship of the center P of the spherical bearing 51 being therebetween. Accordingly, the center P of the spherical bearing 51 can be the center of swing. Also, since the annular protruded parts in an inner cylinder 3341 and the annular protruded parts in the intermediate cylinder 3241 as the step parts are arranged vertically with the center of the swing being therebetween, a load can be received evenly in the step parts.

The present invention is not limited to the above embodiment. Modifications, improvements, and the like within the spirit and the scope of the present invention are included in the present invention. For example, in the present embodiment, the plurality of annular protruded parts in an inner cylinder 3341 and the plurality of annular protruded parts in an intermediate cylinder 3241 as the step parts are respectively provided in the axial direction of the inner cylinder 33 and the intermediate cylinder 32 in a positional relationship of the center P of the spherical bearing 51 being therebetween. However, this configuration is not a limitation. At least one step part only needs to be provided in the axial direction of each of the inner cylinder and the intermediate cylinder in a positional relationship of the center of a spherical bearing 51 being therebetween.

Also, the configuration of each part of the floating joint, that is, the configuration of the fixed base, the movable base, the floating mechanism, the locking mechanism, or the like is not limited to the configuration of each part of the floating joint 1 in the present embodiment, that is, the configuration of the fixed base 10, the movable base 20, the floating mechanism 30, the locking mechanism 60, or the like.

Also, in the present embodiment, the workpiece W is, for example, a case or the like pressed and fitted into the outer side of a stator of a motor including divided cores. However, this is not a limitation. Also, the workpiece W is conveyed from the forming machine FM to the press fitting machine PM. However, this is not a limitation.

EXPLANATION OF REFERENCE NUMERALS 1 floating joint
10 fixed base
20 movable base
30 floating mechanism
31 outer cylinder
32 intermediate cylinder
33 inner cylinder
34 intermediate cylinder biasing spring
51 spherical bearing
52 spherical washer part
60 locking mechanism
324 intermediate cylinder step part
334 inner cylinder step part
511 spherical surface

What is claimed is:
1. A floating joint comprising:
a fixed base;
a movable base;
a floating mechanism that floatingly supports the movable base swingably with respect to the fixed base; and
a locking mechanism that fixes the movable base in a state of not being swingable with respect to the fixed base, wherein
the floating mechanism includes
　a spherical bearing having a spherical surface, and
　a spherical washer part that supports the spherical surface slidably, the locking mechanism is provided in an inner part of the spherical bearing,
the locking mechanism includes
　an inner cylinder that is coupled and fixed to the movable base,
　an intermediate cylinder that covers an outer periphery of the inner cylinder,
　an outer cylinder that covers an outer periphery of the intermediate cylinder and that is coupled to the fixed base, and
　an elastic member that couples the intermediate cylinder and the movable base,
the intermediate cylinder is provided in a manner of being relatively movable in an axial direction of the intermediate cylinder with respect to the inner cylinder and the outer cylinder, and
an outer peripheral surface of the inner cylinder and an inner peripheral surface of the intermediate cylinder have step parts engaged with each other.
2. The floating joint according to claim 1, wherein at least one step part is provided in an axial direction of each of the inner cylinder and the intermediate cylinder in a positional relationship of a center of the spherical bearing being therebetween.

\* \* \* \* \*